United States Patent Office 3,213,071
Patented Oct. 19, 1965

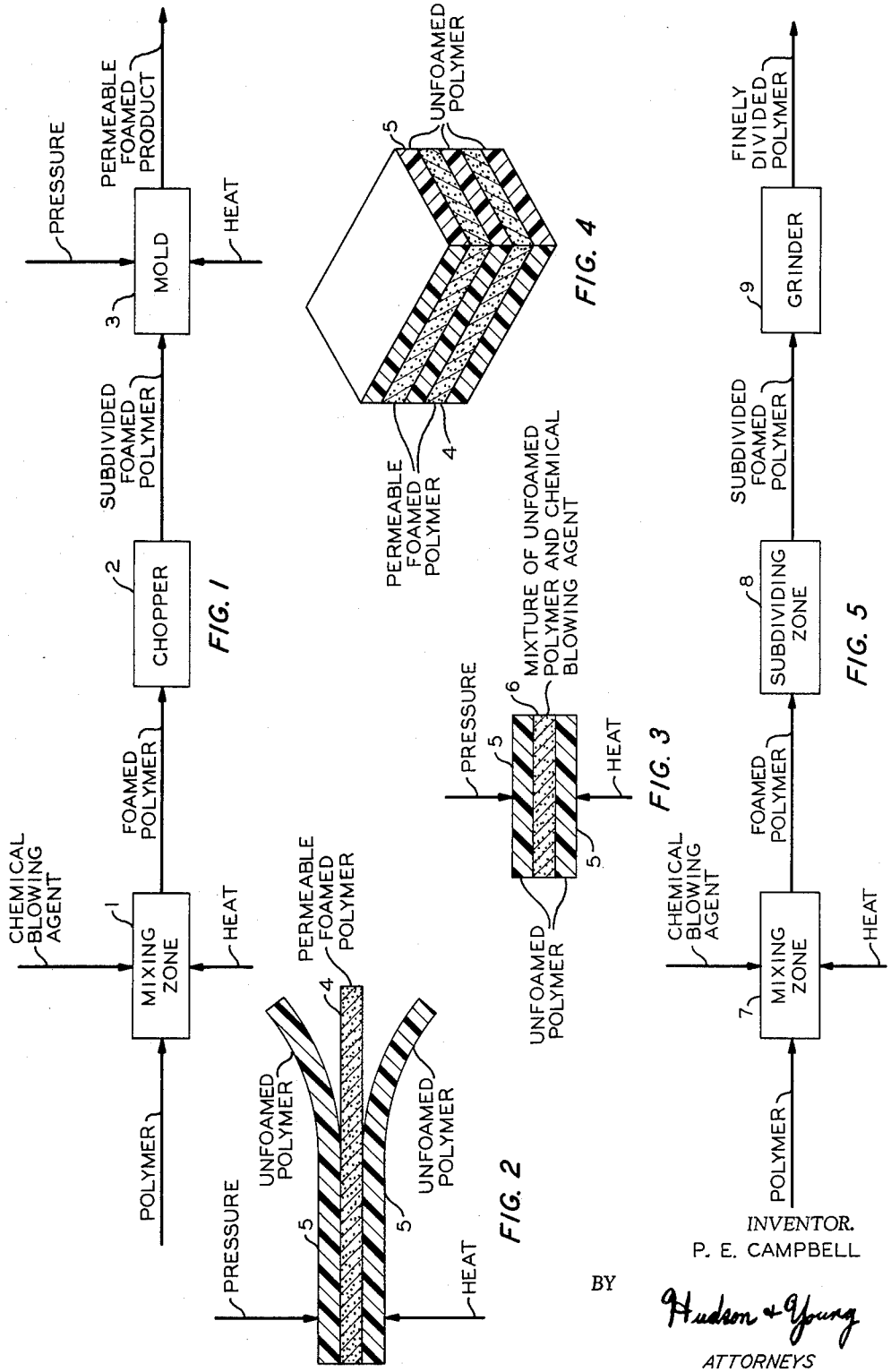

3,213,071
FOAMED OLEFIN POLYMER PROCESS
Paul E. Campbell, Bartlesville, Okla., assignor to Phillips Petroleum Company, a corporation of Delaware
Filed Nov. 16, 1959, Ser. No. 852,944
2 Claims. (Cl. 260—88.2)

This invention relates to foamed polymers of olefins. More particularly it relates to foamed polymers having structures which are permeable and structures which are impermeable to fluids, and methods for preparing said polymers. In another aspect of the invention, it relates to laminated structures comprising plies of foamed and unfoamed olefin polymers and methods for the preparation of said structures. In another aspect of the invention, it relates to an improved method for grinding or pulverizing olefin polymers.

This application is a continuation-in-part of my copending U.S. patent application Serial No. 600,372, filed on July 27, 1956 and now abandoned.

It is an object of this invention to provide improved foamed polymers of olefins.

It is another object of this invention to provide improved foamed polymers of aliphatic mono-1-olefins, which are permeable in nature.

Another object of this invention is to provide improved foamed polymers of aliphatic mono-1-olefins, which are impermeable in nature.

Still another object of this invention is to provide an improved laminated material comprising foamed and unfoamed polymers of olefins.

Yet another object of this invention is to provide new and improved methods for preparing laminated materials comprising foamed and unfoamed polymers of olefins.

A further object of this invention is to provide a novel and improved method for preparing finely divided polymeric materials.

These and other objects of the invention will become more readily apparent from the following detailed description and discussion.

The novel polymeric structures of this invention are formed by initially mixing with polymers of aliphatic mono-1-olefins a chemical blowing agent and subjecting the mixture to an elevated temperature. The foamed material which results is then subdivided and molded under high temperature. Depending on the properties of the blowing agent used and the temperatures and pressures employed during the various stages of the preparation, it has been discovered that it is possible to obtain two types of foamed products. One of these is unicellular in nature and is characterized by being impermeable to liquids and gases. The other type has an open or a "honey-comb" type of structure and is permeable to fluids in general. It was completely unexpected when it was found that a permeable, foamed product could be prepared by adjusting the conditions of preparation, particularly the molding pressure. Accordingly, the present invention is especially applicable to the preparation of such products.

Incorporation of foamed polymers in a laminated structure, as carried out in the method of this invention, will be discussed in detail hereinafter. In general, all of the methods employed involve subjecting alternate plies of foamed and unfoamed polymers to conditions of elevated temperature and pressure which are suitable to provide bonding of the plies. The term "unfoamable" is utilized in the specification and claims to describe a polymer which does not contain a foaming agent and to thereby provide an easily recognized distinction in contrast to an unfoamed polymer containing a foaming agent.

In the drawings FIGURE 1 is a diagrammatic representation of a process for preparing a permeable foamed product in accordance with the invention; FIGURE 2 is a diagrammatic representation of a process for forming a laminate of alternate plies of foamed and unfoamed polymer in accordance with a first embodiment of the invention; FIGURE 3 is a diagrammatic representation of a process for forming a laminate of alternate plies of foamed and unfoamed polymer in accordance with a second embodiment of the invention; FIGURE 4 is a diagrammatic representation of a laminate of alternate plies of foamed and unfoamed polymer which can be formed by the process of FIGURE 2 or the process of FIGURE 3; and FIGURE 5 is a diagrammatic representation of a process for preparing finely divided polymer in accordance with the invention.

In general, any solid polymer of an aliphatic mono-1-olefin can be used within the scope of this invention. Examples of such starting materials include polymers and copolymers of aliphatic mono-1-olefins such as ethylene, propylene, butene-1, hexene-1, octene-1, and the like. Polymers of aliphatic mono-1-olefins having from 2 to 8 carbon atoms per molecule and no branching nearer the double bond than the 4-position provide foamed products having particularly desirable properties.

In a preferred embodiment the invention is directed to the use of polymer materials prepared from ethylene which in an unfoamed state have a density of at least 0.94 and preferably 0.96 or higher and a crystallinity of at least 70 percent and preferably at least 80 percent at ambient temperatures. It has been found that the foamed products of these polymers possess exceptional properties as compared to other polymers. While these polymers provide a preferred embodiment of the invention, other polymers, as related above, can also be used in preparing the products of this invention.

One method of preparing polymers of olefins is described in detail in copending application of Hogan and Banks, Serial No. 573,877, filed March 26, 1956, now Patent No. 2,825,721. This particular method utilizes a chromium oxide catalyst preferably containing hexavalent chromium, with silica, alumina, silica-alumina, zirconia, thoria, etc. In the method of this application, olefins are polymerized in the presence of a hydrocarbon diluent, for example an acyclic, alicyclic or aromatic compound which is inert and in which the polymer is soluble. The reaction is carried out at a temperature between about 150° F. and about 450° F. and usually under a pressure sufficient to maintain the reactant and diluent in the liquid state. The polymers produced by this method, particularly the polymer of ethylene, are characterized by having an unsaturation which is principally either trans-internal or terminal vinyl, depending on the particular process conditions employed. When low reaction temperatures, about 150° F. to about 320° F., and a mobile catalyst are used for polymerization, the product polymer is predominately terminal vinyl in structure. When the polymerization is carried out at higher temperatures and in a fixed catalyst bed, the polymer has predominately trans-internal unsaturation. Polymers prepared by both methods are also characterized by their high densities and high percentage of crystallinity at ambient temperatures.

Other procedures which employ different catalysts may also be used for preparing olefin polymers. For example, suitable polymeric starting materials can be prepared in the presence of organometallic compounds, such as triethylaluminum plus titanium tetrachloride, mixtures of ethylaluminum halides with titanium tetrachloride, and the like. Another group of catalysts which can be used comprises a halide of a Group IV metal such as, for example, titanium tetrachloride, silicon tetrabromide, zirconium tetrachloride, tin tetrabromide, etc., with one or more free metals selected from the group consisting of sodium, potassium, lithium, rubidium, zinc, cadmium and aluminum.

Various blowing agents are used in carrying out the invention. In general, these agents comprise materials which decompose at the temperatures employed in preparing the foamed product and yield gaseous products or components which react with other ingredients present to produce gaseous products. Among the materials which are suitable for this purpose are p,p'-oxy-bis(benzenesulfonyl hydrazide) which is sold under the trade name of Celogen by Naugatuck Chemical, a division of the United States Rubber Company; diazoaminobenzene, dinitrosopentamethylenetetramine, 4-nitrobenzene sulfonic acid hydrazine, beta-naphthalene sulfonic acid hydrazide, diphenyl-4,4'-di(sulfonyl azide), and mixtures of materials such as sodium bicarbonate with a solid acid such as tartaric acid. The amount of blowing agent employed varies, but usually it is in the range of about 1 and about 40 parts by weight per 100 parts of the polymer, such as ethylene polymer.

The foamed material is prepared over a relatively wide range of temperature conditions, which depend principally on the blowing agent selected. Generally the temperature employed varies between about 250° F. and about 500° F. The pressure conditions utilized in the formation of foamed polymers also vary over a wide range, namely, from as low as atmospheric to as high as 800 p.s.i.g. or higher.

Referring now to FIGURE 1, the first step in the preparation of the foamed products of this invention is the incorporation of a chemical blowing agent of the type previously described into the polymeric starting material, e.g., an unfoamed ethylene polymer in a mixing zone 1. This step of the process is carried out at a temperature above the softening point of the polymer and is effected by any suitable method, such as, for example, by mixing on a roll mill or in a Banbury mixer, or the like. Mixing is continued until a substantially homogeneous composition is obtained. The polymer can be foamed during or after the mixing step, depending upon the temperature at which this operation is conducted. If the temperature of mixing exceeds the decomposition temperature of the blowing agent, foaming will result. If not, the polymer in general remains in its original condition. The composition which results from the mixing is then heated in a mold at an elevated temperature and at atmospheric or a higher pressure. If foaming has taken place during the mixing step, the composition is preferably chopped or shredded by means of chopper 2 before being molded in mold 3.

The type of foamed product which is obtained by the aforedescribed procedure can be unicellular in nature, and as such, impermeable to the flow of fluids; or it can have an open or "honey-comb" type of structure which permits free passage of liquids and gases. It appears that foaming per se produces a material having a unicellular structure. However, if the foamed material is formed before molding, i.e., during mixing or in a separate step after mixing, and the foamed product, which is unicellular in nature, is subdivided such as by chopping or shredding before being molded, a permeable foamed product can be obtained. A critical factor in determining the structure of the foamed product prepared in this manner is the molding pressure. Thus, it has been found that if the subdivided foamed material is molded at relatively low pressures, the product obtained is permeable in nature. However, when the molding pressure is increased, a point is reached where the product has the same general structure as the individual foamed particles, namely a unicellular structure. While it is difficult to define the pressure dividing line where the change from one type of product to the other occurs, usually a permeable material is obtained if the pressure is not allowed to exceed about 100 p.s.i.g. Preferably, the pressure is maintained as low as possible and operation at atmospheric pressure is most desirable.

The molding temperature is substantially the same regardless of which type of foamed product is produced. In general, the temperature will be within the range previously given for the preparation of the foamed material, i.e., between 250 and 500° F.

As previously stated, the permeable type of foamed product has an open or "honey-comb" structure, and thus contains passageways through which fluids can be passed. The size of the passages in any given sample of foamed material varies considerably, depending on a number of factors, including the size of the chopped or shredded material before molding, the molding temperature, and the pressure to which the material is subjected in the mold. In general, if the foamed material, prior to molding, is subdivided to provide a fairly uniform particle size of preferably between about 4 and about 40 mesh (U.S. Standard Sieve Series) and molding is carried out within the temperature range given and at substantially atmospheric pressure, the passages in the foamed product will range downwardly in diameter from a maximum of about 1/32 of an inch. With higher pressures the passage size is reduced, and as the mesh size of the shredded material prior to molding is increased, the size of the passageways will increase and may reach a diameter of 1/4 inch or larger.

The time required for the various stages of preparation of the foamed material depend to a great extent on the other operating conditions employed. Generally, the mixing and foaming period required is between about 10 and about 100 minutes, and for molding the time required is usually between about 10 and about 60 minutes.

The foamed polymers of this invention have numerous uses and may be employed as decorative building materials, in the manufacture of acoustical tile and as insulating materials. The permeable foamed products are employed not only in these uses but can also, because of their permeability, be used as filtering materials.

The following examples are given in illustration of methods for preparing the foamed polymers of this invention:

EXAMPLE I

Ethylene was polymerized in a continuous process in a 20 gallon reactor in the presence of a chromium oxide-silica-alumina catalyst containing 2.5 percent by weight of chromium. Prior to the reaction, the catalyst was activated in air by subjecting it to gradually increasing temperature up to 950° F. The operating conditions under which the polymer was formed were as follows:

Ethylene feed rate, lbs./hr. _____ 9
Cyclohexane feed rate, lbs./hr. _____ 54

| | |
|---|---|
| Polymer concentration in reactor, wt. percent | 9 |
| Catalyst concentration in reactor, wt. percent | 0.3 |
| Pressure, p.s.i.g. | 420 |
| Temperature, °F. | 270–280 |

Average properties of the material obtained by blending products from a series of runs employing the above conditions were as follows:

| | |
|---|---|
| Density | 0.96 |
| Softening temperature, °F.[1] | 260 |
| Melt index [2] | 0.6 |
| Injection molded [3]: | |
|     Tensile, p.s.i., 20 in./min. | 5100 |
|     Elongation percent, 20 in./min. | 28 |
| Compression molded [4]: | |
|     Tensile, p.s.i., 20 in./min. | 4200 |
|     Elongation percent, 20 in./min. | 20 |
| Impact strength, Izod, ft. lbs./in. notch [5] | 3 |
| Crystallinity [6] | 93–94 |

[1] Adapted from method of Karrer, Davies, and Dieterich, Ind. Eng. Chem. (Anal. Ed.) 2, 96 (1930).
[2] ASTM D 1238–52T.
[3] ASTM D 638–52T.
[4] ASTM D 412–51T.
[5] ASTM D 256–54T.
[6] At ambient temperature by nuclear resonance methods.

Ten parts by weight of a nitrogen blowing agent which decomposes at 289° F. (Celogen #709) was milled into 100 parts by weight of the ethylene polymer on a roll mill at 300° F. The blowing agent decomposed during milling producing nitrogen to give a blown product which was then chopped in a Wiley mill to give a material having a mesh size of 10–20. This material had a bulk density which was one-half that of a similarly treated ethylene polymer which did not contain any blowing agent.

The blown chopped ethylene polymer was placed in an 0.5 inch thick mold and fused at 329° F. (165° C.) for 30 minutes with no pressure being applied. The product was a honey-comb slab with a bulk density of 0.5. It was very porous in appearance and was permeable to liquids and vapors.

EXAMPLE II

The procedure of Example I was employed for preparing a blend of ethylene polymer with Celogen #709. The ethylene polymer was the same as that described in Example I and the materials were used in the same proportions. Subsequent to chopping the blown product to give a material having a mesh size of 4–20, it was placed in an 0.5 inch thick mold in a sufficient quantity to extend above the top of the mold approximately 0.25 inch and maintained at a temperature of 350° F. for 30 minutes in a gas-tight mold. An impermeable unicellular foamed product was obtained which had a bulk density of 0.5.

EXAMPLE III

Ten parts by weight of sodium bicarbonate and 17.9 parts by weight of tartaric acid were blended with 100 parts of ethylene polymer prepared as described in Example I. Blending was done on a roll mill at 300° F. with no foaming of the polymer occurring during this period. The composition was chopped in a Wiley mill to give a material having a mesh size of 4–20. It was placed in an open mold and heated 40 minutes at 175° C. (347° F.). An impermeable foamed product resulted which had a unicellular structure. The bulk density was 0.1.

EXAMPLE IV

In this example, ethylene polymer was prepared in a similar manner to the polymer used in the previous three examples, however, under the following operating conditions:

| | |
|---|---|
| Ethylene feed rate, lbs./hr. | 10.5 |
| Cyclohexane feed rate, lbs./hr. | 61 |
| Polymer concentration in reactor, wt. percent | 8.5 |
| Catalyst concentration in reactor, wt. percent | 0.4 |
| Pressure, p.s.i.g. | 420 |
| Temperature, °F. | 265–275 |

The product obtained had the following properties:

| | |
|---|---|
| Ash, wt. percent | 0.017 |
| Density | 0.961 |
| Melting point, °F.[4] | 253±2 |
| Melt index [1] | 0.479 |
| Injection molded [1]: | |
|     Tensile, p.s.i. | 5215 |
|     Elongation, percent | 33 |
| Compression molded: | |
|     Tensile, p.s.i. | 4340 |
|     Elongation, percent | 15 |
| Impact strength, Izod, ft. lbs./in. notch [1] | 3.43 |
| Heat distortion, °F.[2] | 179 |
| Stiffness, p.s.i.[3] | 112, 500 |
| Crystallinity [1] | 93–94 |

[1] As in Example I.
[2] ASTM D 648–45T.
[3] ASTM D 747–50.
[4] Determined by melting a sample of the polymer and allowing it to cool slowly, the temperature being plotted against time to obtain a cooling curve. The temperature corresponding to a plateau in the cooling curve was taken as the melting point.

Ten parts by weight of a nitrogen blowing agent which decomposes at 356–410° F. (Celogen AZ) was blended on a roll mill at 300° F. with 100 parts of the ethylene polymer prepared as described above. No foaming of the polymer occurred on the mill. The blend was chopped in a Wiley mill to a mesh size of 10–20 and 80 grams of this material was then placed in a 6″ x 6″ x 0.5″ mold and heated 23 minutes at 385° F. in a gastight mold. An impermeable unicellular product having good cell structure resulted. It had a bulk density of 0.3.

EXAMPLE V

Ten parts by weight of Celogen AZ was blended on a roll mill at 300° F. with 100 parts of the ethylene polymer described in Example IV. No. foaming of the polymer occurred during milling. The blend was chopped in a Wiley mill to a mesh size of 4–20 and was placed in a 1 inch thick non-gastight mold, where it was heated for 20 minutes at 415° F. Heating was continued at the same temperature for 10 minutes in a gastight mold. An impermeable unicellular foamed product was obtained which had a bulk density of 0.28 (17 lbs./cu. ft.).

Test specimens were cut and machined from the molded slab and physical properties were determined. Results were as follows:

| | |
|---|---|
| Flexural strength, p.s.i. [1] | 283 |
| Tensile strength, p.s.i. (0.2 in. per min.) [2] | 211 |
| Impact strength, Izod, unnotched, in. lbs./in. [3] | 8.4 |
| Compressive strength, 5% offset, p.s.i. [4] | 215 |

[1] ASTM D 790–49T.
[2] ASTM D 638–52T.
[3] ATSM D 256–47T.
[4] ATSM D 695–52T.

It is to be noted that the foamed material of Example I, which was prepared by molding shredded foamed polymer under atmospheric pressure was permeable in nature. On the other hand, the product of Example II, wherein the same procedure was followed with the exception that molding was carried out at an elevated pressure, was unicellular and impervious to the flow of fluids. In Examples III, IV and V, foaming occurred during molding and a unicellular product was produced.

EXAMPLE VI

The properties of a number of foamed products of ethylene polymers (prepared under operating conditions similar to those used in preparing the foamed materials of Examples I–V) were obtained for the purpose of comparing the products with foamed products of a commercial polyethylene. The comparison is presented in Table I.

*Table I*

| Material | Density lb./ft.$^3$ | Tensile strength, lb./in.$^2$ | Flex strength, lb./in.$^2$ | Impact, ft.-lb./min. | Compression strength, lb./in.$^2$ |
|---|---|---|---|---|---|
| Commercial polyethylene:* | | | | | |
| (a) Unfoamed | 57.2 | 1,520 | | 11.9 | 780 |
| (b) Foamed | 8 | 42 | 20 | 0.41 | 22 |
| | 10 | 57 | 31 | 0.64 | 32 |
| | 15 | 91 | 64 | 0.82 | 51 |
| Ethylene polymer: | | | | | |
| (a) Unfoamed | 60.1 | 4,475 | | | 1,920 |
| (b) Foamed | 8 | 94 | 66 | 0.19 | 80 |
| | 10 | 146 | 132 | 0.30 | 144 |
| | 15 | 249 | 168 | 0.56 | 257 |

* Control.

The foamed material of this invention is superior to the commercial polyethylene in tensile strength, flex strength and compression strength. As regards compression strength, the superiority of the ethylene polymer is substantially greater than would be indicated by the unfoamed materials. Thus, the foamed ethylene polymer has a compression strength approximately 5 times as great as the foamed commercial polyethylene, as compared to a ratio of about 2.5 to 1 for the unfoamed materials.

As previously stated, in one aspect this invention relates to laminated structures prepared by using alternate layers or plies of unfoamed and foamed polymers of the types previously described. The foamed polymers used in this embodiment of the invention may be of either type, that is, permeable (honeycomb) or impermeable (unicellular). When preparing laminating materials of this nature, the assembled polymer layers are subjected to elevated temperatures and pressures which serve to bind the layers together. Generally, the temperature employed in the laminating process varies between about 250° F. and about 500° F., depending on the polymers employed and the particular method which is used to form the laminate. In any event, it is necessary that the temperature exceed the softening point of the polymers. The pressures involved also cover a wide range and depend primarily on the compressive strength of the foamed polymer, which serves as the upper limit for the pressure imposed. Usually, the pressure varies from about 50 to about 1000 p.s.i.g., preferably from about 100 to about 500 p.s.i.g.

Several methods are used to prepare the laminated material of this invention. In one method, which is illustrated in FIGURE 1 a polymer of an aliphatic mono-1-olefin, e.g., an ethylene polymer, is combined with a blowing agent and subjected to a temperature which is sufficient to cause decomposition of said agent. The foamed polymer formed thereby is chopped or shredded and placed between layers or sheets of unfoamed polymer. The total structure is then heated at a suitable temperature and subjected to an elevated pressure which is maintained below the maximum compressive strength of the foamed polymer. It is possible, of course, to combine the mixing and foaming operation by an appropriate selection of the blowing agent and the mixing temperature.

In another method of preparing laminates, which is illustrated in FIGURE 2 and which is particularly advantageous when the foaming agent decomposes above the temperature employed when mixing the polymer and blowing agent, the subdivided polymer-blowing agent mixture is placed in an extruder which operates at an elevated temperature and pressure. An extrusion assembly is provided whereby sheets of foamed and unfoamed polymers can be produced simultaneously and the resulting hot extruded sheets can be fed through rollers under sufficient pressure to form bonds between the foamed layers 4 and unfoamed layers 5. The extrusion operation is usually carried out at a temperature between about 250° F. and about 500° F. with the take-off rollers being operated in general at a temperature about 20° F. or more below the softening temperature of the polymer.

Other variations in methods of preparation of the laminates of this invention are also employed. For example, foamed sheets of ethylene polymers can be produced either by foaming the polymer in a mold or by heating chopped polymers, which have previously been foamed, in a mold. The laminate is built up from alternate sheets of foamed and unfoamed polymer and the structure is then heated under pressure at a temperature in the range of between about 250° F. and about 500° F. to form strong bonds between the plies. As previously stated, either type of foamed material, namely, unicellular or honeycomb, may be used in forming the laminates.

Still another method of preparing the laminate, which is illustrated in FIGURE 3, comprises placing a mixture 6 of unfoamed polymer and blowing agent between sheets 5 of unfoamed polymer and subjecting the entire structure to an elevated temperature sufficient to decompose the blowing agent and foam the polymer in the mixture. The pressure necessary to bond the foamed polymer and the unfoamed sheets may be provided by external means or it may be provided by the expansion of the polymer which occurs during foaming. In the latter instance the unfoamed sheets of polymer are rigidly positioned with a volume provided therebetween which is less than the uncompressed volume of polymer-blowing agent mixture after foaming. In general, the temperatures and pressures required for this operation are the same as in the other methods of laminate preparation.

A laminate of alternate plies of foamed and unfoamed polymer which can be prepared by any of the above methods is illustrated in FIGURE 4.

Although the preceding discussion has been directed to the formation of ethylene polymer laminates, it is within the scope of the invention to use for this purpose other olefin polymers previously discussed. It is also within the scope of the invention to use more than one polymer material in a single laminate. Thus, for example, the foamed material in a laminate can be an ethylene polymer and the unfoamed portion a polymer of another olefin or a copolymer of ethylene and another olefin, such as a polymer of propylene or an ethylene-propylene copolymer.

In the preparation of pressure laminates, it is usually necessary to provide some type of adhesive composition to form bonds between the materials making up the laminate. One advantage of the present invention is that no adhesive or cement is necessary, that is, the plies are self-bonding. Another advantage is that no compounding or vulcanizing ingredients are required. Also, there is no curing step involved, as is necessary in many compositions.

The following example is given in illustration of a method for preparing a laminated structure using alternate layers of foamed and unfoamed ethylene polymer.

EXAMPLE VII

The ethylene polymer used in this example was prepared by the method described in Example I above. Ten parts by weight of a nitrogen blowing agent which decomposes at 289° F. (Celogen #709) was blended on a roll mill at 300° F. with 100 parts of the ethylene polymer. Blending was continued for approximately 20 minutes to give a homogeneous composition. The blowing agent decomposed during this period to give a foamed product which was then chopped in a Wiley mill to give a material having a mesh size of 10–20.

Two slabs of ethylene polymer, 6″ x 6″ x 1/16″, prepared as described above, were formed by compression molding at 325° F. A laminate was prepared from the slabs and the chopped, foamed material. The mold consisted of two steel plates and an aluminum frame 0.5 inch in height. One molded slab of the polymer was placed on a steel plate which served as the bottom of the mold. The cavity was then filled 1/16–1/8 inch higher than the top of the aluminum frame with the chopped, foamed polymer and the second slab of polymer was placed on the top. The second steel plate was used as a cover for the mold. The assembly was heated for 45 minutes at 350° F. under pressure in an airtight mold. The center ply of the three-ply laminate was foamed polymer. The three plies were bonded firmly to each other.

Also as mentioned hereinbefore, another aspect of the present invention relates to a method for grinding or pulverizing olefin polymers. For many uses, it is necessary that polymer be in finely divided or powder form. For example, in coating articles with polymer by the fluidized bed technique, the polymer must be in powder form if an even coating is to be deposited on the articles. Furthermore, it is desirable in many instances to incorporate in the polymer additive materials such as colorants or fillers, e.g., carbon black, for decorative purposes or for protection against degradation. In order to obtain satisfactory dispersions of these materials and the polymer, it is necessary that the polymer be in a finely divided form. In the production of polymers, such as polyethylene, the product is often pelletized for ease of handling and storage prior to its further utilization in other processes. The polymer pellets are quite difficult to convert into a powder by any of the conventional grinding methods. Referring now to FIGURE 5, it has now been discovered that if the polymer is first foamed as described herein by mixing with a blowing agent in a mixing zone 7 and then heating to above the decomposition temperature of the blowing agent, the resulting foamed polymer can be readily pulverized or ground into finely divided polymer powder. In the usual operation, the foamed polymer is introduced into a subdividing zone 8 wherein it is first cut or shredded into comparatively large pieces which are then pulverized in a hammer or ball mill. When operating in this manner, greatly increased grinding rates are obtained in grind 9 as compared to a similar operation in which unfoamed polymer pellets are utilized. It has been found that by using a foamed polymer in the grinding operation, a finely divided polymer having a particle size in the range of 30 to 325 mesh can be readily obtained.

The finely divided polymer prepared as described above is particularly suitable for use in coating operations employing the fluidized bed technique. It is also within the scope of the invention to carry out the heating step in which the blowing agent is decomposed in such a manner that only partial decomposition of the foaming agent results and the foamed polymer contains residual blowing agent. Thereafter, the foamed polymer is chopped and pulverized as described above so as to obtain a finely divided powder containing residual blowing agent. This powder is then fluidized and used to coat various objects at a temperature such as to decompose the residual foaming agent and form a coating of foamed polymer on the article. A porous coating of polymer prepared in this manner has excellent insulating properties.

A better understanding of the method for preparing finely divided polymer according to this invention can be obtained by referring to the following illustrative example.

EXAMPLE VIII

Ethylene was polymerized in a continuous process in a 3300 gallon reactor, employing a chromium oxide-silica-alumina catalyst containing 2.5 percent by weight of chromium. Prior to utilization in the polymerization, the catalyst was activated in air by subjecting it to gradually increasing temperatures up to 1000° F. The operating conditions under which the polyethylene was formed were as follows:

Polymer concentration in reactor, wt. percent _____ 7.0
Catalyst concentration in reactor, wt. percent _____ .03
Reactor pressure, p.s.i.g. _____ 420
Reactor temperature, ° F. _____ 320

The polyethylene obtained in the above-described polymerization had the following average properties:

Density _____ 0.962
Softening temperature, ° F.[1] _____ 260
Melt index [1] _____ 5.36
Impact strength, izod [1] _____ 1.32
Crystallinity [1] _____ 93–94

[1] See footnotes to table in Example I.

The polymer recovered from the polymerization was subsequently pelletized. Polyethylene pellets were placed on a roll mill at between 315 and 330° F. and milled until the polymer banded (approximately 10 minutes). Three weight percent of a nitrogen blowing agent (Celogen AZ) was added to the roll mill and the milling was continued for 5 minutes. The blend of polymer and blowing agent, which was in a semimolten state, was sheeted off the mill and allowed to cool to room temperature. The sheeted material was then chopped into small pieces of irregular shape, varying in size from about 1/8 to 3/8 inch. The chopped material was then placed in a picture frame mold and put in a press at a temperature between 375 and 380° F. for 15 minutes. The pressure applied to the mold was just sufficient to maintain the material in the frame. The resulting foamed material was then cooled, chopped into pieces and placed in a hammer mill grinder wherein the material was pulverized to powder form. The outlet of the hammer mill grinder was provided with a screen having .039 inch openings. A control run was also carried out in which pellets of unfoamed polyethylene were ground in the hammer mill grinder. The grinding rates were determined by measuring the amount of powdered material which passed from the grinder through the .039 inch screen. After the grinding operation, the powdered polymer obtained was analyzed by means of a series of screens of known mesh size. The results of the runs are set forth hereinbelow in Table II.

*Table II*

| | Foamed polyethylene | Unfoamed polyethylene (Control) |
|---|---|---|
| Grinding rate, lb./hr. | 14.25 | 4.5 |
| Screen analysis of powder, mesh size percent: | | |
| On 35 | 16.9 | 18.9 |
| On 50 | 49.4 | 65.3 |
| On 60 | 9.7 | 6.7 |
| Passed 60 | 24.0 | 9.1 |

It is seen from the foregoing data that a great increase in the grinding rate was obtained when a foamed polyethylene was utilized as compared to unfoamed polyethylene pellets. Furthermore, the screen analysis shows that the amount of polymer particles passing through a 60 mesh screen increased from 9.1 to 24 percent.

The polymer powders obtained in the above described grinding operations were also subjected to a microscopic examination. This examination revealed that the powder prepared from the unfoamed polyethylene pellets was composed of particles having long tails which rendered the powder unsuitable for use in a fluidized coating operation. The particles prepared in the procedure employing foamed polyethylene had less tails and the powder obtained could be fluidized.

Having thus described the invention by providing specific examples thereof, it is to be understood that no undue limitations or restrictions are to be implied by reason thereof, but that the scope of the invention is defined by the appended claims.

I claim:

1. A method for converting a polymer selected from the group consisting of homopolymers of aliphatic mono-1-olefins having from 2 to 8 carbon atoms per molecule and copolymers of mixtures of aliphatic mono-1-olefins having from 2 to 8 carbon atoms per molecule into a material having a finely divided form which comprises subjecting a mixture of said polymer with a chemical blowing agent to a temperature in the range of about 250° F. to about 500° F. at a pressure in the range of atmospheric to 800 p.s.i.g., the amount of said chemical blowing agent being in the range of about 1 to about 40 parts by weight per 100 parts of said polymer to produce gas from said chemical blowing agent and thereby cause foaming of said polymer; chopping the resulting polymer into pieces varying in size from about 1/8 to 3/8 inch; grinding said pieces in a grinding zone to produce finely divided polymer having a particle size in the range of about 30 to about 325 mesh; and withdrawing said finely divided polymer from said grinding zone.

2. A method in accordance with claim 1 wherein said polymer is polyethylene having a density of at least 0.94 and a crystallinity of at least 70 percent.

References Cited by the Examiner

UNITED STATES PATENTS

| | | |
|---|---|---|
| 1,952,766 | 3/34 | Mazer. |
| 2,045,651 | 6/36 | Hill _____ 264—140 |
| 2,256,483 | 9/41 | Johnston _____ 260—2.5 |
| 2,521,470 | 9/50 | Matheson. |
| 2,728,702 | 12/55 | Simon et al. |
| 2,744,291 | 5/56 | Stastny et al. |
| 2,753,596 | 7/56 | Bailey. |
| 2,767,436 | 10/56 | Noland et al. |
| 2,787,809 | 4/57 | Stastny. |
| 2,797,201 | 6/57 | Veatch et al. |
| 2,869,336 | 1/59 | Smidl et al. |
| 2,872,965 | 2/59 | Sisson. |
| 2,878,153 | 3/59 | Hacklander _____ 154—54 |
| 2,885,738 | 5/59 | Henning _____ 260—2.5 XR |
| 2,927,904 | 3/60 | Cooper _____ 260—2.5 |
| 3,024,208 | 3/62 | Goethel et al. |

OTHER REFERENCES

Cellular Polyethylene by Extrusion, pp. 99, 100, 102 and 103 cited.

Modern Plastics, March 1954.

ALEXANDER WYMAN, *Primary Examiner.*

CARL F. KRAFFT, EARL M. BERGERT, *Examiners.*